J. Kinhart,

Harrow.

No. 94,964.  Patented Sep. 21, 1869.

Witnesses
Hugo Vogel
Lewis Myers

Inventor
Jno. Kinhart
pr Saml. S. Reyel
atty

United States Patent Office.

JOHN KINHART, OF ATHENS, ILLINOIS.

Letters Patent No. 94,964, dated September 21, 1869.

IMPROVEMENT IN ADJUSTABLE HARROW.

The Schedule referred to in these Letters Patent and making part of the same

---

To all whom it may concern:

Be it known that I, JOHN KINHART, of Athens, in the county of Menard, and State of Illinois, have invented a new and useful improved Adjustable Harrow, of which the following is a full, clear, and exact description, reference being had to the annexed drawings, making a part of this specification, in which—

Similar letters indicate like parts.

The object of my invention is to produce a harrow adapted to work on stony ground, and that may be readily adjusted to different widths.

It consists of four equal sides, A A', B B', made of timber of any desired size, A A' being limited by a hinge, $a$, and B B' by a similar hinge, $b$, the pivot of the hinge $a$ being the tine $c$, secured in its place by a nut, $d$.

On the ends of A A' are hooks, $e\ e'$, and on B B' are rings $g\ g'$, for the reception of the hooks.

At the apex of B B' is a guiding-yoke, D, attached to B B' by bolts and nuts, as seen, and through the four sides, are inserted tines, 1, 2, 3, &c., in the usual manner.

Figure 1:
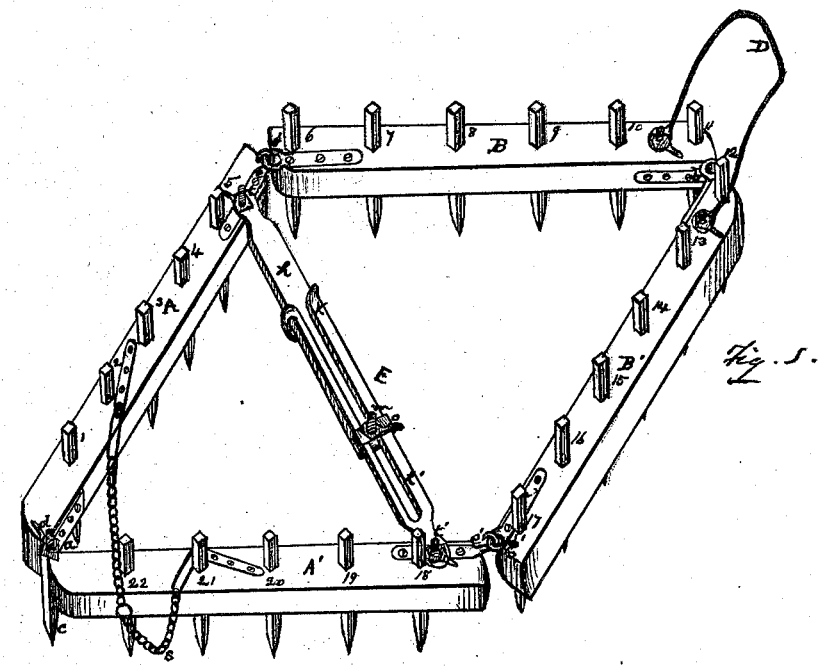
Figure 1 represents a perspective view of same.
Figure 2:
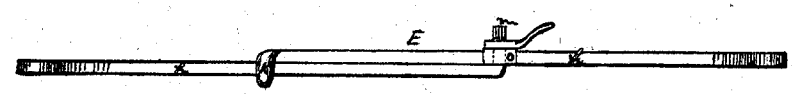
Figure 2 represents a side view of the connecting-bar.
Figure 3:
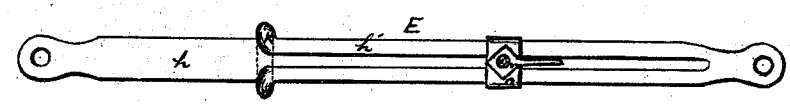
Figure 3 represents a top plan of same.

A cross-bar, E, having eyes in its end, for the reception of screw-bolts $t\ t'$, on the end of A A', connects these sides, being held in place on the bolts by nuts. This bar is made of two parts, $h\ h'$, figs. 1, 2, 3, $h'$ being slotted and bent at one end, so as to form a guide, $k$, for the reception of the end of $h$, which has a threaded pin, $m$, on its extremity, as seen.

On the pin $m$ is placed a clasp, $o$, and then by means of a nut the pin is held at any point in the length of the slot desired.

This clasp $o$ does not encircle the part $h'$, but only fits over the edges, as shown, enough to prevent $h'$ from being drawn through $k$, except when desired, when it may be raised up and turned round.

The draught-chain $s$ is attached to A A', as shown.

By means of the connecting-bar E the harrow may be made to cover a narrow or wide space at pleasure.

When harrowing corn, the front tooth $c$ may be removed and an ordinary bolt inserted, while, by means of the yoke-guide, the rear tines may be prevented from doing any injury. If the harrow becomes clogged it can be easily freed by means of the handle, either by pressing on one side or the other, or raising the end up. When the end of the furrow is reached, by simply pressing on the yoke the harrow may be thrown on one side, when it can be easily turned almost "short" on the angular projection, which becomes a pivot for this purpose.

In harrowing ridgy land the parts of the harrow will rise and fall with the inequalities. When the harrow is to be transported it may be taken apart and folded up, all the nuts being made with projections, by which they may be turned, so as to do away with the necessity of a wrench.

By simply detaching the parts B B', we have a single harrow suited for one horse, and having the advantage over the ordinary harrow of being adjustable.

I do not, of course, claim to be the inventor of an adjustable harrow, or of a rectangular or square harrow made of four parts, united by hinges and bolts; but What I do claim as my invention, and desire to secure by Letters Patent, is—

1. An adjustable harrow, consisting of two parts, A A', united by a hinge and connected by a rod, E, when constructed and arranged substantially as and for the purpose shown and specified.

2. A double adjustable harrow, composed of the devices above specified, and the parts B B', with the guiding-yoke D, all relatively arranged and constructed and operated substantially as and for the purpose shown and specified.

JOHN KINHART.

Witnesses:
T. BARFIELD,
W. S. WAGGONER.